US00H002091H

(19) United States

(12) Statutory Invention Registration (10) Reg. No.: US H2091 H

Scavone et al. (43) Published: Dec. 2, 2003

(54) OVEN-BAKED FRENCH FRIES HAVING EXTENDED HOLD TIME

(76) Inventors: Timothy Alan Scavone, The Procter & Gamble Company, Winton Hill Technical Center, 6100 Center Hill Ave., Cincinnati, OH (US) 45224; Susana Waimin Siu, The Procter & Gamble Company, Winton Hill Technical Center, 6100 Center Hill Ave., Cincinnati, OH (US) 45224; David A. Volker, Sr., The Procter & Gamble Company, Winton Hill Technical Center, 6100 Center Hill Ave., Cincinnati, OH (US) 45224; Jeffrey J. Kester, The Procter & Gamble Company, Winton Hill Technical Center, 6100 Center Hill Ave., Cincinnati, OH (US) 45224; Susan F. Collinge, The Procter & Gamble Company, Winton Hill Technical Center, 6100 Center Hill Ave., Cincinnati, OH (US) 45224

(21) Appl. No.: 09/900,583

(22) Filed: Jul. 6, 2001

(65) Prior Publication Data

US 2001/0055637 A1 Dec. 27, 2001

Related U.S. Application Data

(63) Continuation of application No. 09/747,252, filed on Dec. 21, 2000, which is a continuation of application No. 09/372,196, filed on Aug. 11, 1999, now abandoned.

(60) Provisional application No. 60/096,362, filed on Aug. 13, 1998.

(51) Int. Cl.[7] ..... A21D 13/00; A23F 5/00; A23L 1/216

(52) U.S. Cl. ..... 426/94; 426/92; 426/302; 426/637

*Primary Examiner*—Michael J. Carone
*Assistant Examiner*—Aileen J. Baker
(74) *Attorney, Agent, or Firm*—James F. McBride

(57) ABSTRACT

Coated French fried potatoes which maintain crispness for at least about 10 minutes. The French fries have at least a 0.1 mm starch-based surface coating and Texture Value of at least about 170 after an extended holding time. The holding time is a measurement based on (1) 4 minutes holding under a heat lamp. (2) 3 minutes holding under a heat lamp in Foodservice serving bags and (3) at least 3 minutes holding in a closed carry-out bag. The par-fries have specific properties which, upon oven-finishing, deliver a unique texture. The coated oven-finished French fries have about 28% to about 50% bulk moisture and from about 8% to about 25% total fat.

The par-fried potato strips used to prepare the oven-finished French fried potatoes are coated with a starch suspension. The coating has a low water solubility starch fraction as one of its ingredients. The low water solubility starch fraction has a water solubility index of less than about 30%. The par-fries can be finished in a conventional oven in less than about 10 minutes. The time required to finish the par-fries in a forced air convection oven is less than about 5 minutes. The coated par-fried potato strips have a bulk moisture of about 30% to about 55%, and a total fat of about 6% to about 25%.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OVEN-BAKED FRENCH FRIES HAVING EXTENDED HOLD TIME

CROSS-REFERENCES TO RELATED APPLICATIONS

This application is a continuation of U.S. Ser. No. 09/747,252, filed on Dec. 21, 2000, in the names of Scavone et al., which is a continuation of U.S. Ser. No. 09/372,196, filed on Aug. 11, 1999, now abandoned, in the names of Scavone et al., now abandoned, which claims the benefit of U.S. Provisional application Ser. No. 60/096,362, filed Aug. 13, 1998, now abandoned.

TECHNICAL FIELD

The present invention relates to coated French fried potatoes having extended hold time. More particularly, the present invention relates to coated oven-finished and/or reheatable French fried potatoes, that approximate the attributes and characteristics of deep fried French fries after at least about 10 minutes holding time.

BACKGROUND OF THE INVENTION

French fries are one of the most popular convenience foods. French fried potato strips, commonly referred to as French fries, are served in most fast food restaurants because of their great popularity. However, because the French fries may not be purchased or eaten immediately after frying, purchasers may consume a product of poor quality. Typically this results from the consumer holding French fries (i.e. in a carry-out bag) for an extended time prior to consumption and/or from the fast food restaurant holding the French fries under a heat lamp for an extended time prior to serving the French fries.

Many efforts have been made to extend the holding time of oven-finished French fries. A popular method for extending the holding time has been to apply a coating to the outer surface of the French fries. Coatings have been primarily used to increase the crispness of deep-fried French fries. Although coatings have also been used to increase the crispness of oven-finished French fries, there have been several problems associated with producing coated oven-finished French fries.

One problem has been that the coated oven finished French fries require substantially longer finishing times than finishing by deep-fat frying. The longer finishing time makes oven finishing undesirable for "convenience food" in a fast food restaurant.

Another problem is that the coated oven finished and/or reheatable French fries do not have the desirable deep fried taste and texture of deep fried French fries.

Accordingly, a need exists for producing crisp oven finished and/or reheatable French fries which remain crisp after holding.

It is an object of the present invention to provide oven-finished French fries that can be prepared rapidly.

It is another object of the present invention to provide oven-finished and/or reheatable French fries which are capable of being held for extended periods of time prior to distribution.

Still another object of the present invention is to provide oven finished and/or reheatable French Fries with the taste and texture of deep fried French fries and which have the holding stability of a deep fried French Fry.

These and other objectives of the present invention will be made clear by the disclosure herein.

SUMMARY OF THE INVENTION

The present invention relates to coated par-fries and to oven-finished French fries prepared therefrom. The par-fries have a bulk moisture of from about 30% to about 55% and are coated with a suspension comprising a low water solubility starch fraction having a water solubility index of less than 30%. The coating on the par-fries has a calculated thickness of at least about 0.10 mm. The oven-finished French fries comprise from about 28% to about 50% bulk moisture and from about 8% to about 25% total fat and can be prepared from the coated par-fries in less than about 10 minutes in a conventional oven and less than about 5 minutes in a forced air oven. The oven-finished French fries are characterized in that they have a Texture Value of at least 170 after a hold time of at least about 10 minutes.

The oven finished French fries may be reheated (e.g., after holding) and maintain the texture of deep fried French fries. The oven finished and reheated French fries remain crisp for an extended period of time. The oven-finished/reheated French fries are virtually indistinguishable from freshly fried deep fat fried French fries.

DETAILED DESCRIPTION OF THE INVENTION

The present invention is concerned primarily with the attributes of coated par-fries and the oven finished or reheatable French fries which are ready-to-eat. The ready-to-eat French fries are virtually indistinguishable from deep-fried French fries after an extended hold time of at least about 10 minutes.

The oven-finished French fries of the present invention provide one or more advantages in relation to the organoleptic properties, specifically, the crust crispness, the moistness of the internal core and maintenance of crispness over time. The oven finished fries have substantially the same textural dichotomy as deep-fried French fries. The external surface (i.e., crust) is moderately crisp and not excessively oily and the interior portion (i.e., core) is well cooked, tender, mealy and moist.

The coated oven-finished French fries of the present invention can be differentiated from commercial and prior art oven-finished French fries in that they can be rapidly finished in an oven and possess a textural attribute after an extended holding time that renders them virtually indistinguishable from deep fried French fries. The oven-finished French fries of the present invention can also be differentiated from commercial oven fries based on subjective evaluations (i.e., expert sensory panelists).

DEFINITIONS

As used herein the term "deep fried French fries" refers to potato strips which have been finished cooked to a ready-to-eat form by immersion in hot oil.

As used herein the terms "par-fry", "par-fried", and "par-fries" refer to potato strips that have been subjected to at least one frying process (e.g., deep frying), but which have not been completely cooked to a ready-to-eat form.

As used herein "completely cooked" means "finished".

As used herein the term "oven finishing" refers to converting the product to a ready-to-eat form by cooking in a toaster, toaster oven, forced air convection oven, high air velocity oven, hot air impingement oven, infrared oven, combined convection/infrared oven, microwave oven, combined microwave/convection oven or a conventional home oven.

As used herein the term "conventional oven" refers to a cooking device that does not have forced air.

As used herein the terms "finished French fries" and "finished fries" refer to ready-to-eat potato strips that have been finished by the oven finishing techniques described above and to potato strips that have been fully cooked and simply reheated.

As used herein the term "reheatable" refers to heating (i.e. warming) a finished, ready-to-eat product in a toaster, toaster oven, forced air convection oven, high air velocity oven, hot air impingement oven, infrared oven, combined convection/infrared oven, microwave oven, combined microwave/convection oven or a conventional home oven.

As used herein the term "fat" or "oil" refers to edible fatty substances in a general sense, including natural or synthetic fats and oils consisting essentially of triglycerides, such as, for example soybean oil, corn oil, cottonseed oil, canola oil, sunflower oil, palm oil, coconut oil, fish oil, lard and tallow, which may have been partially or completely hydrogenated or modified otherwise, as well as non-toxic fatty materials having properties similar to triglycerides, herein referred to as fat-substitutes, which materials may be partially or fully indigestible. The terms "fat" and "oil" are used interchangeably.

As used herein the term "finished" refers to a product that has been subjected to a cooking process to convert it from a partially cooked product to a fully cooked ready-to-eat form.

As used herein the term "conditioned oil" refers to oil which has been previously used for frying for such a time that it has developed fried flavor.

As used herein the term "oven finished" refers to a product that has been subjected to an oven baking process to convert it from a partially cooked product to a fully cooked ready-to-eat form.

As used herein the term "oven baking" refers to baking in an oven such as a forced air convection oven, hot air impingement oven, infrared oven, a combination of infrared radiation and convection oven, a toaster, toaster oven, a microwave oven, a combination microwave and forced air convection oven, or a conventional home oven, or any combination thereof.

As used herein the term "force texture value" refers to the maximum force (grams) under the force deformation curve recorded during the first one-third of a compression test (see section on analytical test methods for more details).

As used herein the term "area texture value" refers to the area (gram sec) under the force deformation curve recorded during the first one-third of a compression test (see section on analytical test methods for more details).

As used herein the term "Texture Value" refers to the force texture value and/or the area texture value.

As used herein the term "water solubility index" refers to the solubility of starch measured as (grams of water soluble starch)/(grams of water soluble starch+water insoluble starch). The grams of water insoluble starch is measured after the completion of the thermal profile described herein.

All percentages are by weight unless otherwise indicated.

The distinguishing features of the present invention reside, in part in the recognition of critical physical characteristics of the par-fries. More particularly, the present invention recognizes that for coated finished French fries, a certain range of values for the solubility of the starches present in the starch-based coating and a certain bulk moisture present in the coated par-fries are required for obtaining a certain force texture value and/or area texture value (herein referred to as Texture Value). The par-fries having the requisite attributes are also necessary for maintaining the Texture Value (after about 10 minutes holding) and for delivering finished French fries having optimum palatability.

It is believed that the unique properties of the finished French fries are obtained as a result of the balance between the properties of the par-fries and the properties of the starch-based coatings. In order to produce finished French fries having deep fried texture and an extended holding time, the effect of water migration on the outer crust of the French fry must be controlled. The starch-based coating comprises ingredients that can resist moisture transfer from the high moisture center region (core) of the French fries to the outer crust to prevent loss of crispness on holding. This prevents the crust from becoming soggy after an extended holding time.

It is important that the par-fries have the requisite bulk moisture and fat level. The bulk moisture and fat level should be controlled in order to (1) help control water migration, (2) develop a crisp crust and (3) to produce par-fries that can be rapidly finished in an oven.

COATED PAR-FRIES

One embodiment of the present invention is the coated par-fried potato strips that can be oven finished in a conventional oven in less than or equal to about 10 minutes or in a forced air oven in less than or equal to about 5 minutes. The coated par-fried potato strips comprise a bulk moisture of from about 30% to about 55%. Preferably the bulk moisture is in the range of from about 38% to about 52%. more preferably about 44% to about 50%. The par-fries of the present invention further comprise from about 6% to about 25%, preferably from about 8% to about 22%, more preferably from about 10% to about 20%, and most preferably from about 12% to 18%, fat.

The par-fries comprise a starch-based surface coating. The suspension used to form the starch-based coating comprises from about 15% to about 50%. preferably from about 35% to about 45%, and more preferably from about 38% to about 43% total solids, the balance being water. The solids are comprised of at least about 40%, preferably at least about 50%, and more preferably at least about 60%, of a low water solubility starch fraction having a water solubility index of less than about 30%. The solids may comprise additional ingredients in amounts effective to customize the starch-based coating for certain applications, for example, starches, flours, gums, leavening agents, flavors, spices, preservatives, suspension agents, emulsifiers that can form starch-lipid complexes (e.g., straight chain esters of mono and di-glycerides, polyglycerol esters, propylene glycol mono esters, sorbitan esters, polysorbate esters, partial sucrose esters, soaps of fatty acids and fatty acids), viscosifiers, salt, dextrins, colorants, and proteins.

While not wishing to be bound by theory, it is believed that it is important to use starch with a low water solubility in the starch-based coating. These starches can resist the intermolecular penetration of water molecules into the molecular structure of the starch as moisture migrates from the high moisture inner core to the outer dry crust region. This function is particularly important after the finished French fries are removed from the oven. By preventing the outer crust from transitioning from the glassy (crisp) phase to the rubbery (not crisp) phase, the French fry remains crisp. This transition of the outer crust from the glassy phase to a non-glassy state is responsible for the loss of crisp texture observed when a French fry is held after finishing. The low water solubility starch fraction in the coating has been found to provide functional properties to the coating which are important for French fries having extended hold time.

As used herein "low water solubility starch fraction" refers to starches with a water solubility index of no more than about 30%. Preferably, the low water soluble starch fraction has a water solubility index of less than about 20% and more preferably less than about 15%. The low water solubility starch fraction is characterized in that when exposed to a thermal profile approximating gelatinization conditions (e.g., high temperature exposure in the presence of moisture), the starches remains sufficiently resistant to dissolution in water.

Starches suitable for use as the low water solubility starch fraction may be derived from various starch sources. It should be appreciated that the starches may be modified to reduce the water solubility properties. The starches for use as the low water solubility starch fraction in the starch-based coatings may be selected from tubers, legumes, cereal and grains, for example corn starch, wheat starch, rice starch, waxy corn starch, oat starch, cassava starch, waxy barley starch, waxy rice starch, glutenous rice starch, sweet rice starch, potato starch, tapioca starch and mixtures thereof. The starches may be native starch, chemically modified starches (e.g., cross-linked, lipid complexed starch, esterified starch, oxidized starch), starch derived from genetically modified plant sources to increase amylose content (e.g., high amylose variety corn starch), heat treated starch, fractionated starch, derivatives of these starches, and mixtures thereof. Preferred starches for use as the low water solubility starch fraction component are high amylose starches, chemically modified starches, and mixtures thereof. Preferably, any high amylose starches used in the starch-based coating have an amylose content of at least about 30%, more preferably at least about 50%, and most preferably at least about 70%. As used herein, "high amylose starch" includes the starch from hybrid strains of corn, as well as other starches which contain added, isolated amylose, or which have been enzymatically debranched to yield a starch comprising at least about 30% amylose.

Particularly preferred are starches selected from the group consisting of high amylose corn, chemically modified corn, chemically modified potato and mixtures thereof.

In addition to the low water solubility starch fraction described above, the suspension used to form the starch-based coating may also comprise other starches selected from tubers, legumes, cereal and grains (e.g., tapioca, corn, wheat, rice, potato, oat,) and mixtures thereof.

Flours are also useful in the starch-based coating composition. Suitable flours include rice flour, potato flour, corn flour, masa corn flour, tapioca flour, buckwheat flour, wheat flour, oat flour, bean flour, barley flour and mixtures thereof. Although the starch-based coating compositions may include such flours, these flours represent a smaller portion of the overall composition compared to the starch. These flours will usually make up from about 0% to about 30% preferably from about 10% to about 25% and more preferably from about 15% to about 20% of the total solids present in the starch-based coating composition.

Gums or other viscosity modifying agents may also be used in the composition that forms the starch-based coating. These viscosity modifying agents increase the viscosity of the coating composition. The viscosity modifying agents may also be used to increase the pick-up of coating on to the raw potato strip. Gums for use in the starch-based coating composition include those ingredients generally referred to as gums (cellulose derivatives, pectic substances) as well as plant gums. Examples of gums suitable for use in the present invention include guar gum, carboxymethylcellulose, hydroxypropyl methylcelluose, alginates, xanthan gum, gellan gum, carrageenan gum, gum arabic, gum tragacanth, pectic acids having various degrees of depolymerization and degrees of methylation and mixtures thereof. A particularly preferred gum is xanthan gum.

Gums or other viscosity modifying agents may be used in the starch-based coatings at a level of up to about 5.0%, preferably at a level of about 0% to about 0.5% and more preferably at a level of about 0.005% to about 0.02% of the total solids.

The starch-based coating composition may also comprise leavening agents. Suitable leavening agents include sodium bicarbonate, sodium aluminum phosphate, sodium aluminum sulfate, sodium acid pyrophosphate, dicalcium phosphate, anhydrous monocalcium phosphate and mixtures thereof The most preferred leavening agent comprises a mixture of sodium bicarbonate and sodium acid pyrophosphate.

Leavening may be present in the starch-based coating composition at a level of from about 0% to about 3.0%, preferably from about 0.5% to about 2.5%, and more preferably from about 1.0% to about 2.0% of the total solids.

The starch-based coating composition may also comprise dextrins from any native starch base (e.g., tapioca, corn, wheat, rice and potato) The dextrins suitable for use typically have a dextrose equivalent (D.E.) of at least about 25.

Other optional ingredients may be included in the composition used to produce the starch-based coating. The optional ingredients include color, salt, flavor, vitamins, minerals, antioxidants, preservatives, emulsifiers, emulsion stabilizers and proteins.

Water is added to the solids in the starch-based coating composition to produce a suspension for coating the raw potato strips prior to par-frying. The amount of water is suitably adjusted according to the desired coating properties. The concentration of the coating should be adjusted so as to produce a starch-based coating having a pickup rate in the range of from about 5% to about 30%, preferably in the range of about 10% to about 25%. and more preferably in the range of 18% to about 23%. The pickup rate may vary depending on the amount of solids in the starch-based coating and/or the viscosity of the starch-based coating.

PREPARATION OF COATED PAR-FRIES

In the preparation of coated par-fries, raw potatoes are first subjected to the conventional preliminary processing steps typical for French fry production techniques. Raw potatoes are (1) washed, (2) optionally, peeled (3) cut into strips having the desired size and shape and (4) blanched (e.g., steam blanching, hot water blanching, heating). Preferably, the blanching is carried out by subjecting the raw potato strips to water and/or steam at a suitable temperature for a suitable time. The time and temperature will vary depending on various factors (e.g., type of potatoes, sugar level of potatoes) and can be determined by one skilled in the art. Procedures for washing, peeling cutting and blanching potatoes to prepare French fries are discussed in "Potato Processing" by William F. Talburt and Ora Smith, Fourth Edition, 1987, published by AVI Publishing Company Inc; Westport, Conn., at pages 503–509.

The coated par-fries may be prepared from a variety of raw potatoes known to be suitable for preparing French fries. Preferably the par-fried potato strips are prepared from potatoes of the Russet Burbank, Shepody or Katahdin varieties. The potato strips may be of varying shapes and sizes. However, it is preferred that the relatively thin and elongated potato strips known in the art as "shoestrings" be used. "Shoestring potato strips", as used herein, refers to potato strips that are from about 3/16 to about 5/16 inch square in cross-section and from about 2.5 to about 5.0 inches in length. Thicker-cut potato strips, e.g., "crinkle cut" strips, straight cut thick potato strips (also known as "regular-cut") and "steak fry" cuts may also be used in the invention described herein.

Following blanching, the potato strips may be subjected to additional optional treatments known in the art. For example, the potato strips may be treated with sodium acid pyrophosphate (SAPP), a chelating agent used to prevent discoloration of the strips. Dextrose may also be applied to the surface of the strips in order to yield a desired level of brown color development during subsequent processing. Optionally, salt as a brine solution may also be applied to increase the saltiness impression of the finished French fries. Additionally, the potato strips may be partially dried, preferably at a temperature less than about 110° F. (43.4° C.) to produce a moisture loss of from about 10% to about 15%.

After blanching and if desired, optional treatments, and drying, the potato strips are coated with a starch-based suspension comprising a starch component having a water solubility index of less than about 30%. The starch-based coating may be applied to the potato strips by any suitable method known in the art. Examples of suitable methods include spraying, brushing and/or pouring the starch-based coating onto the strips or dipping the strip into the starch-based coating.

The coated potato strips are then par-fried in oil at a temperature of about 325° F. (162.7° C.) to about 420° F. (214.6° C.), to a bulk moisture content of about 60%. The par-fries are then frozen. The frozen par-fries are again fried to a bulk moisture content in the range of from about 30% to about 55%. Various processes may be used to reduce the moisture content of the par-fries. One way of reducing the moisture is by using a single frying process, whereby the coated potato strips are immersed in oil at temperatures of from about 280° F. (137.8° C.) to about 380° F. (193.3° C.), preferably from about 325° F. (162.8° C.) to about 365° F.(185° C.), and most preferably from about 335° F. (168.3° C.) to about 355° F. (179.4° C.) for a time sufficient to reduce the bulk moisture of the potato strips down to a range of about 30% to about 55%. Other frying techniques may also be used, such as a heated oil spray which surrounds the potato strip with hot oil or frying using an oil foam.

Moisture reduction may also be accomplished in a two fry process. The coated par-fried potato strips are (1) fried, cooled, chilled or frozen and fried a second time generally as described in U.S. Pat. No. 4,632,838 issued to Doenges Dec. 30, 1986; U.S. Pat. No. 5,242,699 issued to Bednar et al., U.S. Pat. No. 4,900,576 issued to Bonnett et al., Feb. 13, 1990; and U.S. Pat. No. 4,590,080 issued to Pinegar May 20, 1986, with the par-fries having a final bulk moisture content of about 30% to about 55% by weight. U.S. Pat. No. 4,632,838, U.S. Pat. No. 5,242,699, U.S. Pat. No. 4,900,576 and U.S. Pat. No. 4,590,080 are herein incorporated by reference to the extent that they are not inconsistent with the present invention. Preferably the first frying temperature is higher than that of the second. The temperature of the fryers range from about 280° F. (137.8° C.) to about 380° F. (193.3° C.). The actual time required for any given frying step is determined by several factors; including the specific oil temperature, dimensions and temperature of the potato strips, the batch size, volume of the frying kettle, and initial moisture content of the potato strips and can be determined by one skilled in the art.

The coated par-fries of the present invention may also be prepared using commercially available par-fries comprising at least 60% bulk moisture, preferably from about 70% to about 64% bulk moisture. It must be remembered that these commercially prepared par-fries may have been subjected to multiple processing steps (i.e., par-fry and freezing, multiple par-fryings and freezing). Therefore, when using commercially prepared par-fried potato strips it is believed to be important that the par-fries have a moisture content greater than or equal to 60% prior to coating and subsequent frying.

Another process that may be used in preparing par-fries of the present invention comprises par-frying the coated potato strips under vacuum conditions after the starch-based coating has been set.

The potato strips may be par-fried in edible fats and oils known in the art Suitable fats and oils include natural or synthetic fats and oils consisting essentially of triglycerides which may have been partially or completely hydrogenated or otherwise modified . Any number of oils, such as soybean oil, cottonseed oil, peanut oil, corn oil, palm oil, canola oil, rapeseed oil, sunflower seed oil, lard, tallow and other similar oils are suitable for use. Oils such as olive oil, avocado oil, safflower oil, sesame oil, walnut oil, rice oil, or rice bran oil can also be used. Fats and oils that comprise non-toxic synthetic triglycerides having physical properties which are comparable with those of triglycerides, which material can be partially indigestible or indigestible, such as for example, polyol polyesters or mixtures thereof. Also suitable for use, are virgin oils, genetically bred oils, bioengineered or microbially sourced oils or oils processed to remove undesirable characteristics. A particularly preferred process for removing the undesirable characteristics of oil is described in U.S. Pat. No. 4,789,554, issued to Scavone et al., Dec. 12, 1986, herein incorporated by reference. The oils may be used alone or as blends.

The terms "fat" and "oil" are used interchangeably herein unless otherwise specified. The terms "fat" or "oil" refer to edible fatty substances in a general sense, including natural or synthetic fats and oils consisting essentially of triglycerides, which may have been partially or completely hydrogenated as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEANÒ.

Particularly preferred are non-digestible fats such as those described in U.S. Pat. Nos. 3,600,186 to Mattson et al., issued May 12, 1970; 4,005,195 to Jandacek, issued Jan. 25, 1977: 4,005,196 to Jandacek et al. issued Jan. 25, 1977; 4,034,083 to Mattson, issued Jul. 5, 1977; and 4,241,054 to Volpenhein et al., issued Dec. 23, 1980, all of which are incorporated by reference.

As used herein, the term "polyol" is intended to include any aliphatic or aromatic compound containing at least 2 free hydroxyl groups. Polyols include sugars (i.e., monosaccharides, disaccharides, and trisaccharides), sugar alcohols. other sugar derivatives (i.e., alkyl glucosides), polyglycerols such as diglycerol and triglycerol, pentaerythritol, sugar ethers such as sorbitan and polyvinyl alcohols. Specific examples of suitable sugars are mannose, galactose, arabinose, xylose, ribose, apiose, rhamnose, psicose, fructose, sorbose, tagatose, ribulose, xylulose, and erthrulose. Oligosaccharides suitable for use herein include, for example, maltose, kojibiose, nigerose, cellobiose, lactose, melibiose, gentiobiose, turanose, rutinose, trehalose, sucrose and raffinose. Polysaccharides suitable for use herein include, for example, amylose, glycogen, cellulose, chitin, inulin, agarose, zylans, mannan and galactans. Although sugar alcohols are not carbohydrates in a strict sense, the naturally occurring sugar alcohols are so closely related to the carbohydrates that they are also preferred for use herein. Natural sugar alcohols which are suitable for use herein are sorbitol, mannitol, and galactitol. Particularly preferred classes of materials suitable for use herein include the monosaccharides, the disaccharides and sugar alcohols. Preferred unesterified polyols include glucose, fructose, glycerol, alkoxylated polyglycerols, sugar ethers, and linked alkoxylated glycerines as described in U.S. Pat. No. 5,516,544 to Sekula et al., issued Jun. 14, 1996, incorporated by reference. A particularly preferred polyol is sucrose. Preferred alkoxylated polyols are described in the following U.S. Patents, incorporated by reference herein; U.S. Pat. No. 5,273,772 to Cooper, issued Dec. 28, 1993; U.S. Pat. No. 5,288,884 to Cooper, issued Feb. 22, 1994; U.S. Pat. No. 5,298,637 to Cooper, issued Mar. 29, 1994; U.S. Pat. No. 5,362,894 to Handwerker et al., issued Nov. 8, 1994; U.S. Pat. No. 5,374,446 to Ferenz et al., issued Dec. 20, 1994; U.S. Pat. No. 5,387,429 to Cooper, issued Feb. 7, 1995; U.S. Pat. No. 5,427,815 to Ferenz, issued Jun. 27, 1995; U.S. Pat. No. 5,466,843 to Cooper, issued Nov. 14, 1995; U.S. Pat. No. 5,516,544; U.S. Pat. No. 5,589,217 to Mazurek, issued Dec. 31, 1996; and U.S. Pat. No. 5,597,605 to Mazurek, issued Jan. 28, 1997. More preferred alkoxylated glycerines are linked alkoxylated glycerines and are described in the following patents, previously incorporated herein, 5,374,446; 5,427,815; and 5,516,544. Especially preferred alkoxylated glycerines are those described in U.S. Pat. No. 5,516,544, previously incorporated by reference.

By "polyol fatty acid polyester" is meant a polyol having at least 2 fatty acid ester groups. It is not necessary that all of the hydroxyl groups of the polyol be esterified, but it is preferable that disaccharide molecules contain no more than 3 unesterified hydroxyl groups for the purpose of being non-digestible. Typically. substantially all, e.g., at least about 85% of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers. (e.g., cis- or trans- isomers) and can be the same for all ester groups, or can be mixtures of different fatty acids.

Liquid non-digestible oils can also be used in the practice of the present invention. Liquid non-digestible oils which have a complete melting point below about 37° C. include liquid polyol fatty acid polyesters (see Jandacek; U.S. Pat. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634: issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris: U.S. Pat. No. 5,399,371, issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN$^{O}$, a preferred non-digestible fat, is made by The Procter and Gamble Company. These preferred non-digestible fats are described in Young; et al., U.S. Pat. No. 5,085,884, issued Feb. 4, 1992, and U.S. Pat. 5,422,131, issued Jun. 6, 1995 to Elsen et al.

After par-frying the coated potato strips to a bulk moisture in the range of from about 30% to about 55%, the coated par-fried strips may be oven finished immediately or may be chilled or frozen for storage purposes. Chilling or freezing of the par-fries can be accomplished by methods known in the art. For example, the par-fried potato strips may be subjected to a blast of cold air at a temperature of less than about -20° F (-29° C.), or the strips can be immersed in a liquid refrigerant, such as liquid nitrogen. Any conventional freezing process can be used. It is preferred that the par-fried potato strips be frozen quickly, i.e., in less than 20 minutes. The par-fried potato strips may also be enrobed with a thin layer of fat or oil either before or after chilling or freezing.

The enrobing oil may be applied by spraying oil onto the surface of the parfried potato strips, or the parfried potato strips may be enrobed by immersion into a bath of oil. The enrobing oil may be flavored oil.

When the coated par-fries are prepared for consumption, such as at a retail food outlet, the par-fried potato strips are cooked in an oven preferably for from about 0.50 minutes to about 10 minutes, the oven being at a temperature from about 325° F. (162° C.) to about 600° F. (316° C.). A preferred time for such finish baking in a forced air convection or hot air impingement oven, with the coated par-fries arranged principally in a single layer is for from about 0.5 minutes to about 5.0 minutes, preferably from about 1.0 to 4.0 minutes, more preferably from about 1.5 to about 3.0 minutes at a temperature of from about 350° F. (176.7° C.) to about 500° F. (260° C.). The fries can alternatively be finished in a consumer's home oven. Since most home consumers do not own a deep-fat fryer, they will very much appreciate a good quality baked French fry. The finished French fries of the present invention can be prepared by baking the coated par-fry in a conventional home oven in less than or equal to about 15 minutes, preferably less than or equal to about 12 minutes, more preferably less than or equal to about 10 minutes, and most preferably less than or equal to about 8 minutes.

Upon removal from the oven, oil and/or salt may optionally be applied to the coated baked fries to further enhance flavor and mouthfeel. The oil may comprise other ingredients, for example, amino acids, reducing sugars, flavoring, colorants, vitamins (e.g., vitamin A, vitamin D, vitamin K) and the like. Preferably, the oil applied to the coated baked fries is a flavored or conditioned oil. The oil may be applied to the surface of the baked fries by methods known in the art; e.g., by spraying warm oil onto the surface or by rapid immersion of the fries into a reservoir of warm oil.

The bulk moisture, fat content and starch-based coating are important attributes of the par-fries. These attributes are important for producing the oven-finished French fries of the present invention. Of particular importance are (1) the properties of the low water solubility starch fraction in the starch-based coating, (2) the distribution of water in the par-fry (3) the thickness of the coating on the finished French fries, and (4) maintenance of crust crispness (Texture Value) for an extended period of time.

By controlling these attributes, ready-to-eat finished French fries having an extended holding time can be prepared. The textural dichotomy that results in the finished fries is very similar to that which exists in French fries that are finished by deep frying.

FINISHED FRENCH FRIES

The finished fries further comprise an estimated coating thickness of at least 0.10 mm, preferably at least about 0.30 mm, more preferably at least about 0.60 mm. The outer starch layer thickness, force texture value and/or area texture value after holding can be increased by either increasing the amount of solids in the coating and/or by increasing the viscosity (e.g. by using suspension agents/viscosifiers) of the coating to increase the coating pickup rate.

Texture Value after Holding

An important attribute of the present invention is the Texture Value of the finished French fries after holding under conditions typical of that which occur in a carryout situation. This value is dependent on a combination of factors such as bulk moisture content, moisture in the outer crust region, moisture in the inner crust region, crust thickness, length of holding time after finishing, conditions under which the French fries are held, and other physical properties of the fries. The conditions under which French fries are held directly after finishing are particularly important to the Texture Value obtained.

The Texture Value is determined by the use of a Texture Analyzer equipped with a rectangular, blunt steel plate probe. A compression test is run in which the plate compresses the French fry while the force of resistance is measured (see section on analytical test methods for details). The force (grams) vs. time (sec) data is plotted to produce a force deformation curve. Two textural parameters obtained from the force deformation curves are used to characterize the texture of French fries, average maximum force (grams) and average area (gram sec) within the first ⅓ of the compression test. We have found both of these parameters to correlate with the crispness of French fries and either one may be designated as the Texture Value. Finished French fries of the present invention exhibit distinctive textural dichotomy and are characterized by a Texture Value (i.e., maximum force or area) of at least about 170 after holding at least about 10 minutes. Preferably, the Texture Value after holding is from about 200 to about 1000, more preferably from about 220 to about 600, and even more preferably from about 240 to about 500. Further, the oven-finished French fries of the present invention have a ratio of the average area to the average maximum force of at least 1.0, preferably 1.04 or greater, more preferably 1.08 or greater, even more preferably 1.12 or greater, and most preferably 1.16 or greater. Commercially available coated par-fries prepared according to the bake time limitations described herein produce oven-finished fries that lack dichotomous textural characteristics found in the finished fries of the present invention. Typically the average maximum force (grams) and the average area (gram sec) for commercial and prior-art oven fries prepared according to the bake time limitations described herein are below 170 after holding and the ratio of the average area to the average maximum force is about 1.0 or less.

The coated oven-finished French fries of the present invention maintains a Texture Value of at least about 170. preferably at least about 200. more preferably at least about 220 and most preferably at least about 240 for at least about 10 minutes, more preferably for at least about 12 minutes and most preferably for about 14 minutes after holding.

Bulk Moisture

Another critical attribute of the present invention is the bulk moisture content of the coated oven-finished French fries. Bulk moisture is the total amount of water in the fries of the present invention. The coated oven-finished French fries of the present invention have a bulk moisture of from about 28% to about 50%. Shoestring cut, finished French fries of the present invention have a bulk moisture of from about 28% to about 46%, preferably from about 33% to about 44%, and more preferably from about 34% to about 40%. Thicker-cut coated oven-finished French fries of the present invention (e.g. regular cut, crinkle-cut and steak fries) typically have a bulk moisture of from about 35% to about 50%, preferably from about 38% to about 48% and more preferably from about 40% to about 46%.

Coated finished French fries with a bulk moisture much greater than about 50% will not have developed a sufficient crust structure to yield the desired textural dichotomy (i.e., the fries will lack crispness). At a bulk moisture much less than about 28% the finished fries can become too dry. Keeping the bulk moisture of the finished fries of the present invention at a level between about 28% and 50% allows production of finished fries that possess both a low-moisture, crisp, crust region as well as a high-moisture internal region, while allowing the crust to remain crisp after holding. The bulk moisture of the products herein is measured as set forth below.

Total Fat

An edible oil, natural oil or fatty material having properties similar to trigycerides, is generally on the surface and within the crust region of the finished French fry of the type disclosed in the present invention. Edible fats and oils contribute to the flavor, lubricity and texture of the finished French fries. The edible fats and oils present on the surface and within the crust region of the finished French fries are well known by one skilled in the art. The edible oils are described above under "Preparation of Coated Par-fries". Examples of these edible oils include but are not limited to beef tallow, lard, cottonseed oil, canola, soybean oil, corn oil, palm oil, fish oil, safflower oil, sunflower oil, coconut oil, peanut oil. medium chain triglycerides, structured triglycerides containing a combination of short or medium chain fatty acids and long chain fatty acids (e.g. Caprenin-like) and the like or combinations thereof. The oils mav be conditioned or flavored. see *Flavored Vegetable Oils as a Substitute for Beef Tallow in Deep Frying Applications,* Food Technology, pp. 90–94 (1989) and U.S. Pat. No. 5,104,678 (Yang et al.).

The oils may be partially or completely hydrogenated or modified otherwise. Additionally non-toxic, fatty materials having properties similar to triglycerides such as sucrose polyesters and Olean®, from The Procter and Gamble Company, and reduced calorie fats, polyol fatty acid polyesters, and diversely esterified polyol polyesters or combinations of regular fats and fat substitutes may also be present on the surface and/or within the crust region of the finished French fries.

Some preferred oils are partially hydrogenated soybean oil and corn oil. The finished fries of the present invention comprise from about 8% to about 25% total fat. Shoestring French fries of the present invention typically have from about 12% to about 25% total fat, preferably from about 13% to about 23% fat, and more preferably from about 14% to about 20% total fat. Thicker-cut oven-finished French fries (e.g. regular cut, crinkle-cut and steak fries) typically have a total fat level of from about 8% to about 22%. Preferably the thicker-cut oven-finished French fries have a total fat level of from about 10% to about 20%, and more preferably from about 12% to about 18%.

Preferably the total fat or oil present in the finished French fries of the present invention has a free fatty acid level of about 0.8% or less.

Additional Ingredients

Flavoring agents, such as salt, pepper, butter, onion, or garlic may be added to the par-fries or the coated finished fries to enhance the flavor or modify the flavor to any desired taste. One skilled in the art will readily appreciate that the aforementioned listing of flavoring agents is in no way exhaustive, but is merely suggestive of the wide range of additives which are suitable for use in the practice of the present invention.

Other ingredients known in the art may also be added to the edible fats and oils used to fry and/or coat the par-fried potato strips, including antioxidants such as TBHQ, chelating agents such as citric acid, antifoaming agents such as dimethylpolysiloxane, and vitamins such as vitamin A, D, E and K.

ANALYTICAL TEST METHODS

A number of parameters are used to characterize elements of the par-fried potato strips and the oven-finished French fries of the present invention. They are quantified by particular experimental analytical procedures. Each of these procedures is described in detail as follows:

Method To Determine the Water Solubility Index

Starch is heated using a Rapid Visco Analyzer Series 4 (manufactured by Newport Scientific Pty, Ltd. Instrument Support Group ½ Apollo Street, Warriewood NSW 2102, Australia). The starch is heated with distilled water at a ratio of 3 grams of starch to 25 grams of distilled water (adjusting for the moisture already present in the starch). The starch and distilled water mixture is analyzed using the standard 1 testing procedure outlined in "Operation Manual for the Series 4 Rapid Visco Analyser, issued June 1995, copyright by Newport Scientific Pty. Ltd. at pages 16–17, herein incorporated by reference.

After the thermal profile is completed, a 3–5 gram sample of the mixture is withdrawn and centrifuged at 60,000 RPM for 60 minutes at 25° C. in an ultracentrifuge. The sample will contain a clear top layer (containing the water soluble starch) and a cloudy bottom layer (containing the water insoluble starch). The amount of each layer is weighed. Each layer is individually mixed to ensure uniformity. The percent moisture in each layer is measured by Thermal Gravimetric Analysis. Moisture is analyzed by heating, from room temperature to about 300° C. (at a heating rate of 10° C. per minute in a dry nitrogen atmosphere), a 3–20 mg sample from each layer in a Perkin-Elmer Thermal Gravimetric Analyzer (model TGA-7). The percent moisture is calculated as the percent weight loss between room temperature and 200° C. The percent starch in this layer is 100 percent minus percent moisture. The water solubility index is calculated as:

Grams Of Water Soluble Starch

The Total grams of soluble starch is calculated by multiplying the grams of the clear layer collected times the % starch measured in the clear layer.

Grams Of Insoluble Starch

The Total grams of insoluble starch is calculated by multiplying the grams of the cloudy bottom layer collected times the %starch measured in the cloudy layer.

Water Solubility Index

The water solubility index is calculated as:

$$= \frac{\text{Water Soluble Starch (Grams)}}{\text{Water Soluble Starch (Grams)} + \text{Water Insoluble Starch (Grams)}} \times 100$$

Method for Determining Coating Pick-up $$\% \text{ Pick Up} = \frac{\text{Weight of Par fries (after coating)} - \text{Weight of par fries (before coating)}}{\text{Weight of Par fries (after coating)}} \times 100$$

Method Of Holding Finished French Fries Prior To Texture Measurement

The protocol below is used to simulate the typical types of conditions that occur in carryout. Immediately after finishing the French Fries are placed under a heat lamp in a food service holding bin for 4 minutes. The fries are then bagged in commercial food service serving bags (~3 ounces) and held for 3 more minutes under heat lamps in a holding station. After this holding period, four (4) serving bags of French fries are placed in a closed carry-out bag and the bag is closed by folding the top part over itself. The closed paper bag is held under normal room temperature conditions for at least about 3 minutes. The total holding time may vary from about 10 minutes to about 14 minutes. Immediately following this holding period, the texture is measured according to the method described below.

Method To Determine The Texture Value After Holding

The Texture Value is determined by the use of a Texture Analyzer. The Texture Value of finished French fries, which correlates with crispness of the fries, is measured with a TA-XT2 Texture Analyzer (version 05.16 equipped with 25-1 load cell, Texture Technologies Corp., Scarsdale, NY). The Texture Analyzer is linked to a standard personal computer (e.g. IBM 433DX) that records the data via a software program called XT.RA Dimension (version 3.7H, Texture Technologies Corp., Scarsdale, N.Y.).

The Texture Analyzer is configured with a rectangular, blunt steel plate probe (2.5–3.0 mm thickness, 70 mm width, 90 mm length) that is fastened vertically to the main arm. A "Compression Test" on a single French fry is run to generate a plot of Force (grams) vs. Time (sec), from which the Texture Value is obtained.

| Procedure for Set-up and Calibration of the Texture Analyzer | |
|---|---|
| 1. Set-up the Texture Analyzer as follows: | |
| Mode: | Measure Force in Compression |
| Option: | Return to Start |
| Force Units: | Grams |
| Time Units: | Seconds |
| Distance Format: | Strain |
| Pre-Test Speed: | 2.0 mm/sec |
| Probe Test Speed: | 1.0 mm/sec |
| Post-Test Speed: | 10 mm/sec |
| Strain: | 85.0% |
| Trigger Type: | Auto 10 |
| 2. Set the texture method as follows: | |
| Graph Type: | Force vs. Time |
| Auto-Scaling: | Off |
| Force Scaling Max: | 5000 grams |
| Force Scaling Min: | 0 grams |
| Peak Confirmation: | On |
| Force Threshold: | 20 grams |
| File Type: | Lotus 1-2-3 |

-continued

| Procedure for Set-up and Calibration of the Texture Analyzer | |
|---|---|
| Display and Export: | Plotted points |
| Acquisition Rate: | 200 pps |
| Force Units: | Grams |
| Contact Area: | 1.00 $mm^2$ |
| Contact Force: | 5.0 grams |

3. Calibrate the force by placing a 5 kg weight on the calibration platform and press the "calibrate" button on the Texture Analyzer key pad.
4. Calibrate the probe distance from the base plate with a probe starting distance from the plate of 10 mm for shoestring-cut fries (increase probe starting distance to 15 mm for thick-cut or steak fries). Ensure that the bottom surface of the probe is parallel to the surface of the base plate.

Procedure for Sample Measurements

1. Using the holding profile described above, hold the French fries prior to measurement and place a single French fry flat on the base plate of the Texture Analyzer (oriented perpendicular to the probe width). Initiate the Compression Test (1.0 mm/sec probe speed) while manually holding the ends of the French fry flush against the base plate.
2. The resulting Force (grams) vs. Time (sec) data is saved for later analysis. Nine additional fry samples from the same batch are tested in an identical manner. The ten fry samples from each batch are selected randomly. Texture analysis of the ten fry samples should be completed within 3–4 minutes. (3–4 minutes after Step 1).
3. Steps #1–#3 are repeated for each new batch of French fries. Generally, 5 to 10 batches of each type of French fry are evaluated in this manner.

Data Analysis

1. The "Force vs. Time" plot for each individual French fry sample is evaluated for the following:
   Maximum Force (grams) within the first ⅓ of the test.
   Area (gram sec) under the curve within the first ⅓ of the test. (e.g. if the Compression Test requires 6 seconds to complete, the Maximum Force and Area are obtained from the 0–2 second time period)
2. After analysis of the "Force vs. Time" data for all ten French fry samples selected from a given batch, the ten Maximum Force values are averaged and the ten Area values are averaged. A computer program written in Excel automates the task of analyzing the Force vs. Time data for each fry sample and averaging the Maximum Force and Area values for each batch of fries.
3. Remaining batches of a particular French fry type are analyzed in a similar manner (5–10 batches are tested; 10 fries/batch are analyzed). The Maximum Force and Area values for each batch are then averaged to yield an overall average Maximum Force (grams) and Area (gram sec) for that particular fry type.
4. For the purpose of this invention, either the overall average Maximum Force or Area may be designated as the French fry Texture Value. The overall average maximum force is referred to herein as the force texture value whereas the overall average area is referred to herein as the area texture value. Both measurements correlate to crispness of finished French fries.

Method for Determining Estimated Coating Thickness (in mm)

The thickness of the starch coating on the ready-to-eat French fries (mm) is based on an estimate calculated as:

$$\frac{X}{2}\left\{\sqrt{(Y+Z)/Y}-1\right\}\times 25.4$$

Where:

X=French Fry average cross-sectional dimension (inches) (e.g., average of cross-sectional width and height)

Y=lbs. Of Potato Solids Added through the raw potato

Z=lbs. Of Coating Solids Added from the coating; and wherein 25.4 is a conversion factor for converting inches into millimeters.

Bulk Moisture Content Test

Moisture content of par-fried potato strips and finished French fries is determined by a forced air oven method as follows:

1. Uniformly grind up a representative sample of potato strips or French fries in a blender or conventional food processor.
2. Accurately weigh approximately 5 grams of ground sample (weight "A") into a previously tared metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "B") by subtracting the dish tare weight.
6. Calculate the percent moisture of the sample as follows:

$$\%\ \text{Moisture}=[(A-B)/(A)]\times 100$$

Total Fat Content Test

Total fat content of par-fried potato strips, and finished French fries is determined by a solvent extraction method as follows:

Apparatus

1. Soxtec HT6 extraction system; unit includes heating block and cooling condenser.
2. Recirculating water bath for cooling condenser.
3. Recirculating oil bath for heating block.
4. Extraction beakers.
5. Extraction thimbles, 26 mm (Fisher TC1522-0018).
6. Nitrogen purging gas
7. Vacuum drying oven
8. Analytical balance (4 place)
9. Dispensing pipette (50 ml)

Materials

1. Methylene chloride (Baker 9315-33)
2. Boiling stones (Chemware PTFE Fisher 09-191-20)
3. Silicone oil (Fisher TC1000-2779)
4. Glass wool (Fisher 11-390)

Procedure

1. Uniformly grind a representative sample of potato strips or French fries in a blender or conventional food processor.
2. Accurately weigh (to four places) a piece of glass wool (sufficient in size to contain sample pieces in the thimble) and the extraction thimble; record weight of thimble+glass wool (weight "A").
3. Load the ground sample into the thimble and cap the loaded thimble with the pre-weighed piece of glass wool.
4. Accurately weigh (to four places) and record the weight of the ground sample. thimble,+glass wool (weight "B").
5. Place two or more boiling stones into an extraction beaker and weigh (to four places); record weight of extraction beaker+boiling stones (weight "C").
6. Place loaded thimbles on the extraction unit and raise the thimbles to rinse position.
7. Pipette 50 ml of methylene chloride into each pre-weighed extraction beaker with boiling stones.
8. Set oil heating bath to 110° C. and water cooling bath to 28.3° C. and allow temperatures to equilibrate.
9. Lower the loaded thimbles into the extraction beaker containing the solvent and allow to boil in the solvent for 60 minutes with the condenser's stop cock in the open position.
10. Raise the thimbles to the rinsing position and rinse for 60 minutes.
11. Turn the condenser's stop cock to the closed position and allow the solvent to evaporate for 60 minutes. Turn the nitrogen purging gas on to aid the evaporation.
12. Transfer the beaker to a vacuum oven, pre-warmed to 120° C. for 30 minutes at full vacuum (about 30 mm Hg pressure or less).
13. Allow the beaker to cool to room temperature and weigh (to four places); record the weight of the beaker +boiling stones +extracted fat (weight "D").
14. Calculate percent total fat as follows:

$$\%\ \text{Fat}=[(D-C)/(B-A)]\times 100$$

The disclosed embodiments are considered in all respects to be illustrative and not restrictive. The scope of the invention is indicated by the appended claims.

EXAMPLE 1

Raw Russet potatoes are sorted, washed and peeled. Strips are cut into shoestring strips, and then blanched in hot water for 3.5 minutes at 165° F. (79.3° C.). A salt, dextrose and sodium acid pyrophosphate solution is then sprayed onto the potato strips. The strips are then pre-dried at a temperature of 165° F. (73.8° C.) for a time sufficient to effect a moisture loss of about 10%.

After pre-drying, a coating is applied by dipping the potato strips in a tank of coating. The characteristics of the starches and the solids composition of the coating are listed below in Table I and Table 2, respectively.

The starch-based coating has a solids content of 41.5%, the balance being water. The batter pickup rate is 18% resulting in a calculated theoretical crust thickness of 0.65 mm.

The French fries are then deep-fat fried at a temperature of 375° F. (190.6° C.) to a moisture of about 60%,o. This par-fry is then frozen for 20 minutes in a blast freezer at -15° F (-26.1° C.). After freezing, the product is fried again in oil at a temperature of 320° F (1 60.0° C.) for 150 seconds to a final bulk moisture content of 47%. The product is again frozen (as above).

The French Fry is then finished by baking in a high air velocity oven at 395° F. (201.7° C.) for 2 minutes. It is then sprayed with oil and salted.

After baking the French fries are placed in a conventional foodservice holding bin under a heat lamp for 4 minutes. The fries are then bagged in commercial Foodservice serving bags and held for 3 more minutes under heat lamps. After this, the bagged fries are placed in a closed carry-out bag, (4 small bags per paper bag). The paper bag is held for 7 minutes (at room temperature away from the heat lamp).

The French fry has 15% fat and 37.7% moisture, and a Texture Value after holding of 214.

TABLE 1

| Type Of Starch | Water Solubility Index |
|---|---|
| Cross-linked Potato Starch | 1.97% |
| High Amylose Corn Starch (70% Amylose) | 5.9% |
| Long Grain Rice Flour | 2.6% |

TABLE 2

| Ingredients | Wt. % |
|---|---|
| Cross-linked Potato Starch | 39.245 |
| High Amylose Corn Starch (70% Amylose) | 30.83 |
| Tapioca dextrin | 13.215 |
| Long Grain Rice Flour | 15.0 |
| Sodium Acid Pyrophosphate | 1.0 |
| Sodium Bicarbonate | 0.70 |
| Xanthan gum | 0.01 |
| Total | 100.00 |

EXAMPLE 2

Commercially available par-fries having 64% moisture are dipped in an aqueous starch-based coating solution. The composition of the coating solids is listed below in Table 1.

The coating has a solids content of 20%, the balance being water. The coated strip is drained. The pickup rate is about 10%, resulting in a calculated coating layer thickness of about 0.15 mm. The drained strip is fried in oil at a temperature of 320° F (160.0° C.) to a final bulk moisture content of 47%. The product is frozen for 20 minutes in a blast freezer at −15° F. (−26.1° C.). The par-fries are finished in a high velocity air impingement oven at temperature of 395OF (190.5° C.) for 2 minutes and 16 seconds. After finishing, salt and oil are both applied to the French fries. The French Fries are held using the holding protocol described in the analytical section herein for a total time of 14 minutes. The French fries have a fat content of 15% and a moisture content of 37.1%, and a Texture Value after holding of 237.

TABLE 3

| Ingredients | Wt. % |
|---|---|
| High Amylose Corn Starch | 70.00 |
| Tapioca Dextrin | 30.00 |
| | 100.00 |

EXAMPLE 3

Raw Russet potatoes are sorted, washed and peeled. Strips are cut into shoestring strips, and then blanched in hot water for 3.5 minutes at 165° F (79.3° C.). A salt, dextrose and sodium acid pyrophosphate solution is then sprayed onto the potato strips. The strips are then pre-dried at a temperature of 165° F (73.8° C.) for a time sufficient to effect a moisture loss of about 10%.

After pre-drying, a coating is applied by dipping the potato strips in a tank of coating. The characteristics of the starches and the solids composition of the coating are listed below in Table 4 and Table 5, respectively.

The starch-based coating has a solids content of 41.5%, the balance being water. The batter pickup rate is 18% resulting in a calculated theoretical crust thickness of 0.65 mm.

The French fries are then deep-fat fried in Olean a, available from The Procter & Gamble Company, at a temperature of 375° F (190.6° C.) to a moisture of about 60%. This par-fry is then frozen for 20 minutes in a blast freezer at −15° F. (−26.1° C.). After freezing, the product is fried again in Olean at a temperature to 320°F. (160.0° C.) for 150 seconds to a final bulk moisture content of 47%. The product is again frozen (as above).

The French Fry is then finished by baking in a high air velocity oven at 395° F. (201.7° C.) for 2 minutes. It is then salted.

After baking the French fries are placed in a conventional foodservice holding bin under a heat lamp for 4 minutes. The fries are then bagged in commercial Foodservice serving bags and held for 3 more minutes under a heat lamps. After this, the bagged fries are placed in a closed carry-out bag, (4 small bags per paper bag). The paper bag is held for 7 minutes (i.e., away from the heat lamp).

The French fry has 13% Olean â, available from The Procter & Gamble Company, and 38.0% moisture, and a Texture Value after holding of 225.

TABLE 4

| Type Of Starch | Water Solubility Index |
|---|---|
| Cross-linked Potato Starch | 1.97% |
| High Amylose Corn Starch (70% Amylose) | 5.9% |
| Long Grain Rice Flour | 2.6% |

TABLE 5

| Ingredients | Wt. % |
|---|---|
| Cross-linked Potato Starch | 39.245 |
| High Amylose Corn Starch (70% Amylose) | 30.83 |
| Tapioca dextrin | 13.215 |

TABLE 5-continued

| Ingredients | Wt. % |
|---|---|
| Long Grain Rice Flour | 15.0 |
| Sodium Acid Pyrophosphate | 1.0 |
| Sodium Bicarbonate | 0.70 |
| Xanthan gum | 0.01 |
| Total | 100.00 |

What is claimed is:

1. Par-fried potato strips comprising from about 30% to about 55% bulk moisture, from about 6% to about 25% fat; said par-fried potato strips having a surface starch-based coating, the starch-based coating comprising a low water solubility starch fraction.

2. Par-fried potato strips of claim 1 having from about 38% to about 52%o bulk moisture.

3. Par-fried strips of claim 1 having from about 44% to about 50% bulk moisture.

4. Par-fried potato strips of claim 1 wherein the starch-based coating comprises a low water solubility starch fraction selected from the group consisting of native starch, heat treated starch, genetically modified starch, fractionated starch, chemically modified starch and mixtures thereof.

5. Par-fried potato strips of claim 4 wherein the low water solubility starch is selected from the group consisting of potato starch, tapioca starch, wheat starch, rice starch, corn starch, and mixtures thereof; and wherein the low water solubility starch fraction further comprises at least 30% amylose.

6. Par-fried potato strips of claim 4 wherein the starch-based coating further comprises gums, leavening, flour, emulsifiers, starches other than low water solubility starches, dextrin, or mixtures thereof.

7. Par-fried potato strips of claim 4 wherein the starch-based coating comprises from about 15% to about 50% solids, and wherein at least 40% of the solids consist of a low water solubility starch fraction having a water solubility index of less than 30%.

8. Par-fried potato strips of claim 7 having from about 8% to about 22% fat and wherein at least 60% of the solids in the starch-based coating consist of a low water solubility starch fraction having a water solubility index of less than 30%.

9. Par-fried potato strips of claim 8 wherein the fat is a non-digestible fat.

10. Par-fried potato strips of claim 8 further comprising vitamins, flavorings, colorants, salt and mixtures thereof.

11. French fried potato strips, comprising:

(a) from bout 28% to about 50% bulk moisture;

(b) from about 8.0% to about 25% total fat;

(c) a force texture value or an area texture value of at least about 170 after a hold time of at least about 10 minutes; and (d) a starch-based coating comprising a low water solubility starch fraction; the French fries being prepared in an oven in less than or equal to about 10 minutes.

12. French fried potato strips according to claim 11 wherein the starch-based coating comprises a low water solubility starch fraction having a water solubility index of less than about 20%.

13. French fried potato strips according to claim 11 wherein the French fries are prepared in a conventional oven.

14. French fried potato strips according to claim 11 wherein the French fries are prepared in a forced air convection oven and wherein the French fried potato strips are prepared in less than or equal to about 5 minutes.

15. French fried potato strips produced from par-fries comprising a starch-based coating that comprises, prior to par-frying, from about 15% to about 50% solids, wherein at least 40% of the solids consist of a low water solubility starch fraction having a water solubility index of less than 30%.

16. French fried potato strips of claim 14 wherein the starch is selected from the group consisting of potato starch, wheat starch, tapioca starch, rice starch, corn starch, and mixtures thereof.

17. French fried potato strips of claim 15 having a force texture value or an area texture value of at least about 170 after a hold time of at least about 14 minutes.

18. French fried potato strips of claim 17 wherein the fat is a non-digestible fat.

19. French fried potato strips of claim 17 wherein the low water solubility starch fraction is selected from the group consisting of a native starch, genetically modified starch, chemically modified starch, fractionated starch and mixtures thereof.

20. French fried potato strips of claim 17 further comprising flavoring, colorants, vitamins, salt or mixtures thereof.

* * * * *